May 26, 1936.  W. H. MARTIN  2,042,322

WELDING MACHINE

Filed Aug. 29, 1935  2 Sheets-Sheet 2

Inventor
William H. Martin
By Faust F. Crampton
Attorney

Patented May 26, 1936

2,042,322

UNITED STATES PATENT OFFICE 2,042,322

WELDING MACHINE

William H. Martin, Detroit, Mich.

Application August 29, 1935, Serial No. 38,340

3 Claims. (Cl. 219—4)

My invention has for its object to provide a welding apparatus wherein a plurality of welders are caused to sequentially operate to produce a plurality of welds along a line of jointure of metal parts, each of the welders having means for controlling the flow of the welding current and for producing a welding pressure in advance and subsequent to the momentary flow of the welding current.

My invention also provides means for locating the welding points with respect to the welders as to enable operations of the welders to produce closely positioned welds.

The invention consists in other features which will appear from the following description and upon examination of the drawings. To illustrate a practical application of the invention, I have selected a welding machine as an example of the various structures that contain the invention and shall describe the selected structure hereinafter. The particular structure selected is shown in the accompanying drawings.

Figure 1:
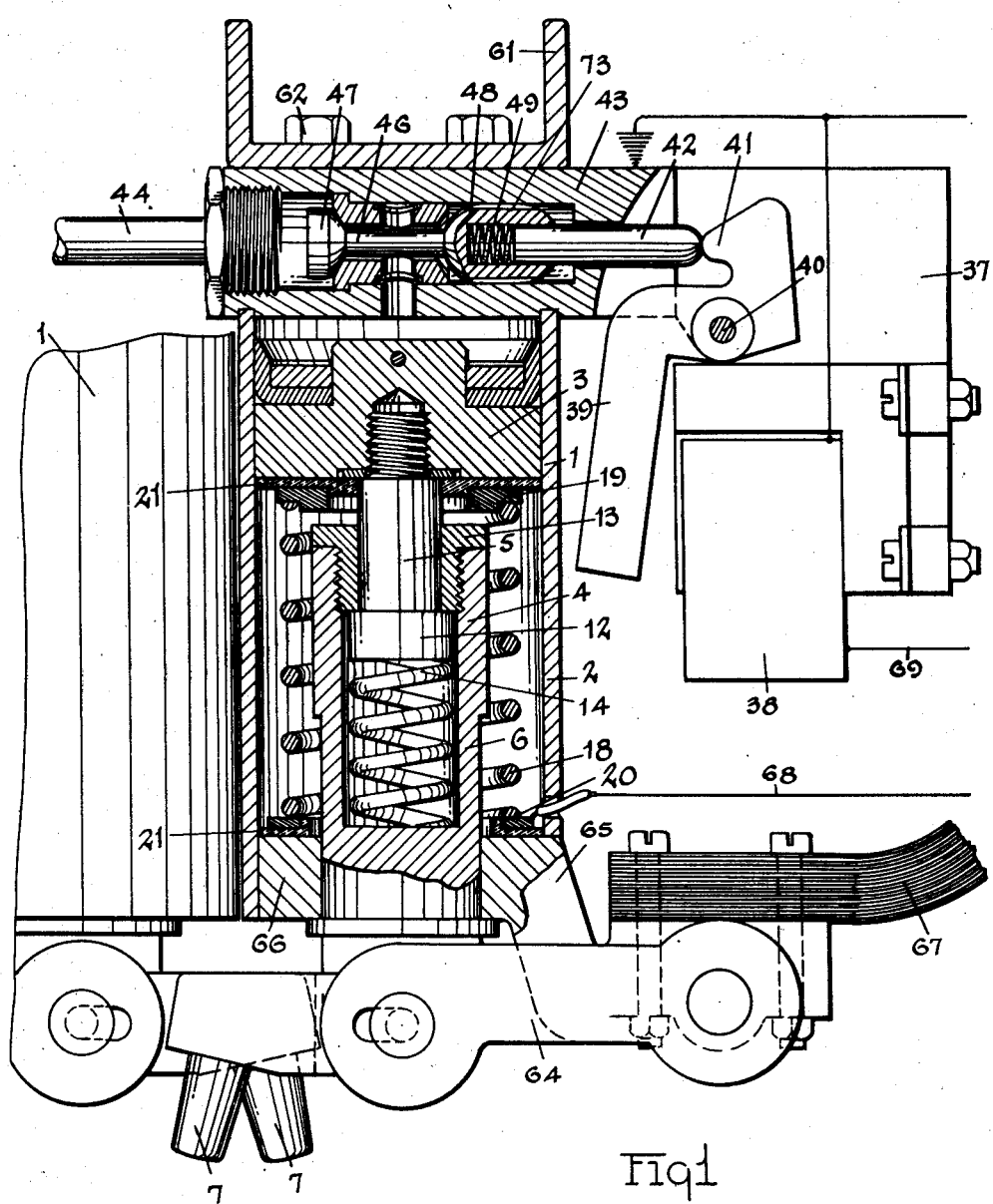
Figure 1:
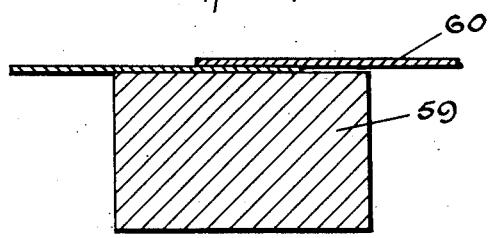
Figure 2:
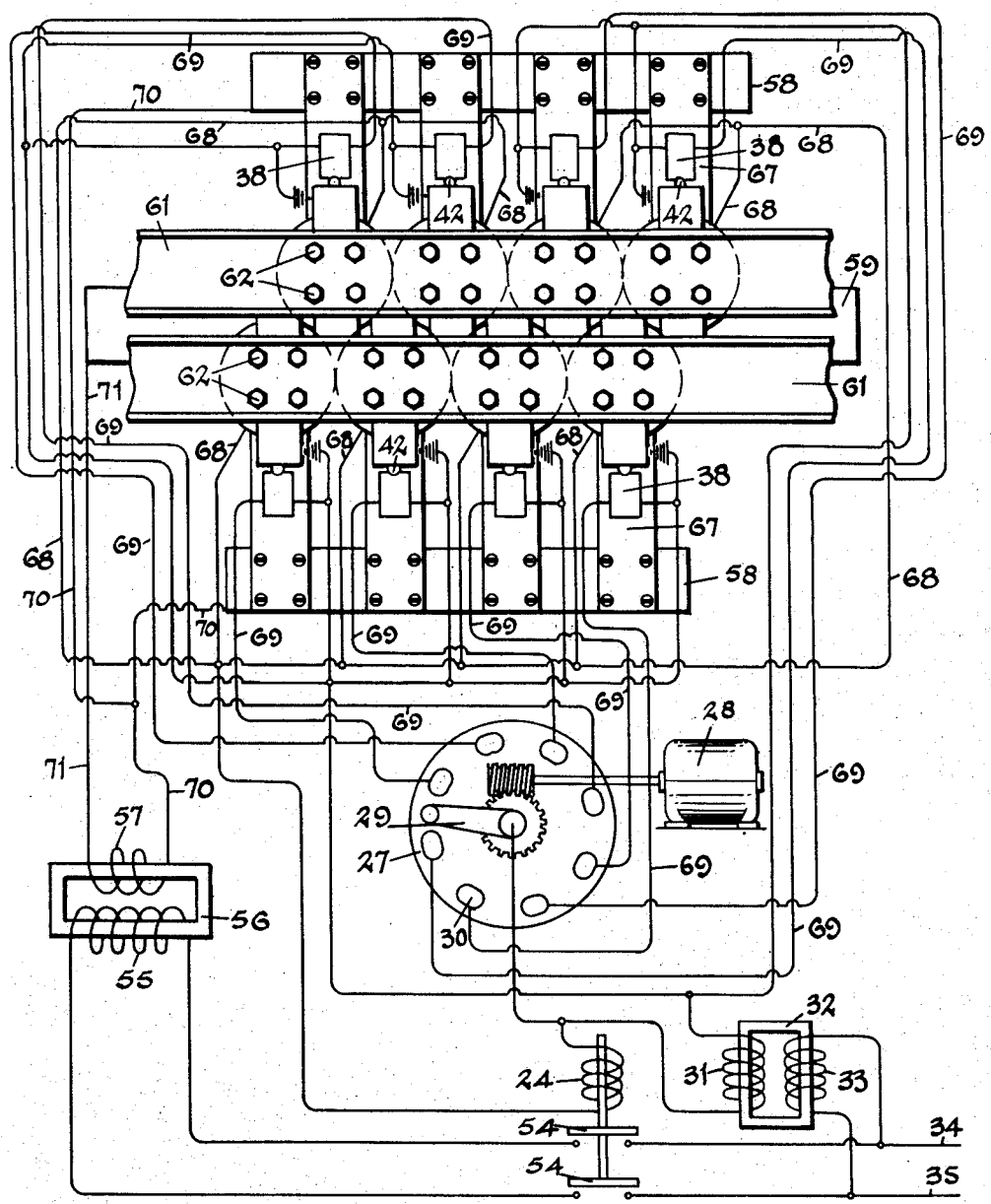

Fig. 1 illustrates a section and a broken view showing welders located in position with reference to the work. Fig. 2 illustrates diagrammatically the welders and the electric connections for controlling the welders and producing the welding current.

In the particular welding machine illustrated in the drawings, the welders are arranged in two rows, the rows of welders being supported by bars and the welders of one row located in staggered relationship with reference to the welders of the other row, in order to closely position the welds along substantially the center line of overlapping marginal portions of the metal parts to be welded together. The welding points are pressed against the work by pressure transmitted through a suitable fluid medium, such as air, which is controlled by valves located in the ends of the welders. The valves are electro-magnetically operated, and the flow of the welding current is controlled by the pressure exerted to produce the required welding pressure.

Each of the welders 1 is provided with a cylinder 2 having a piston 3 to which is connected the piston rod 4 formed of two telescopically arranged parts 5 and 6. The part 5 is connected to the piston 3, while the part 6 is connected to means for operating the welding point 7. The part 5 is in the form of a stud, which is threaded into the piston 3 and is provided with a head 12, while the part 6 is in the form of a sleeve in which the head 12 is located. The part 5 extends through a bushing 13 which is threaded into the part 6. The bushing 13 guides the part 5 in its telescopic movements relative to the part 6. A spring 14 is located intermediate the head 12 of the stud or part 5 and the lower end of the sleeve or part 6 and yieldingly resists the relative movement of the parts of the piston rod 4 with a pressure sufficient to the relative movement of the parts until the pressure of the welding point on the work is equal to that of the required welding pressure.

An electric conductor spring 18 is located exterior to the piston rod 4 and is insulatingly supported within the cylinder 2. The spring 18 is located intermediate the piston 3 and the lower end of the cylinder wall, and its ends are located in contact with the conductor washers 19 and 20, which are insulatably supported by the insulating rings 21. The conductor ring 20 is connected with the contact maker or commutator 27, and the current passes through the spring 18 to the conductor or contact ring 19. When, therefore, the piston 3 descends, it moves the welding point against the work, and by transmission of the pressure on the piston through the spring 14, the pressure of the point on the work is raised to the required welding pressure. The subsequent movement of the piston 3 relative to the part 6 of the piston rod moves the conductor or contact ring 19 against the bushing 13 to close the circuit of a relay magnet 24 which controls the flow of a welding current through the welding point 7 and the work.

The welding points 7 of the welders are operated sequentially by means of the commutator 27. The commutator 27 may be electrically driven by means of a suitable electric motor 28 to produce sequential operation of the air valves of the welders. The commutator 27 is provided with a suitable contact arm 29 that is rotated by the motor 28 to make sequential electric connection with the contacts 30. The arm 29 is connected to the secondary 31 of the transformer 32. The primary 33 is connected to the main lines 34 and 35. The contacts 30 of the commutator 27 are connected to the magnets 38 which are supported on the welders.

The magnets 38 are supported on brackets 37 that protrude from and form a part of the valve containing heads 43 of the cylinders 2. The armatures 39 are located in operative relation with respect to the magnets 38 and are pivotally supported on the brackets by means of the pivot pins 40. The armatures are provided with noses 41 that engage the ends of the pins 42 that extend into the heads of the cylinders. The air control valves are located in the heads of the cylinders and are operated by the armatures 39 to open and close the connection of the cylinders with the source of supply of air under pressure.

The source of air under pressure is connected to the heads 43 by the pipe 44, and the movement of the air to and from the cylinders 2 is controlled by moving the movable valve members 46 in directions at right angles to the axes of the cylinders. The movable valve members 46 are provided with the valve heads 47 and 48. The normal pressure of the air operates to close the heads 47 against their seats and thus close the connection of the source of air supply with the interior of the cylinders. The pins 42 extend into the sockets formed in the heads 48. Springs 49 are located in the sockets and intermediate the ends of the pins 42 and the bottoms of the sockets.

When a magnet 38 is energized, the armature 39 operates to move the pin 42 and, through the pressure of the spring 49, operates the valve member 46 to separate the head 47 from its seat and to seat the head 48. The air under pressure then flows through the passageways of the heads 43 into the cylinders 2 and first raises the pressure on the piston sufficiently to produce a welding pressure on the points 7, and then to move the parts of the piston rod 4 relative to each other to complete the circuit through the relay magnet 24 and cause the welding current to pass through the welding points 7. The relay magnet or solenoid 24 operates a pair of contacts 54 to connect the primary 55 of the transformer 56 with the main lines 34 and 35 and produce in the secondary 57 of the transformer a current of sufficient amperage to produce the welds.

The secondary 57 is connected to the bus bars 58 and 59. The work 60, which may consist of a pair of overlapping marginal parts formed of sheet metal, such as automobile body parts that are to be welded together, are disposed on the bus bar 59 which may be shaped to conform to the marginal parts that are to be thus joined together. The welders are supported on bars, such as the channel bars 61, that correspond in shape to the marginal parts that are to be joined together to dispose the welders so as to locate the welding points 7 at a desired angle with reference to the surfaces of the overlapping marginal portion of the parts to be welded together.

Each welder is secured to a channel bar 61 by suitable bolts 62 that are threaded into the cylinder heads 43. In order to locate the welding points 7 in relatively close and aligned positions, the welders supported by one of the bars 61 may be located in staggered relation to the welders supported by the other of the bars 61, and the welding points 7 are supported in position at or near the extensions of the cylindrical surfaces of the cylinders 2. The welding points 7 are supported on levers 64 that are pivotally mounted on brackets 65 that protrude from the lower ends of the welders 1. The lower ends of the cylinders have heads 66. A bracket 65 extends from one side of each head 66, and the lever 64 extends across the head 66 and protrudes from the opposite side of the welder. The levers are connected to the parts 6 of the piston rods 4. The welding points 7 are supported on the free ends of the levers 64 and, upon the operation of the pistons, the levers press the welding points against the work.

The levers 64 are connected to the bus bar 58 by means of the laminated flexible conductors 67. When, therefore, the welders 7 are pressed against the work 60, the circuit through the conductor spring 18 is completed by contact of the conductor ring 19 with the bushing 13, which completes the circuit through the line 68, which is connected to the welder having its control magnet 38 energized by the contact of the arm 29 with the contact 30 connected to the welder by means of the line 69. The magnet 24 then operates the switch 54 to produce a welding potential difference in the bus bars 58 and 59 that are connected to the secondary by means of the lines 70 and 71, and cause the flow of the current through the work and welding point 7 that is pressed against the work. The current continues to flow as long as the contact arm 29 is in contact with the contact 30. When the contact arm 29 moves from the contact, the air valve is released, and the head 47 again seats, and the head 48 unseats by the pressure of the air. The head 48 is channeled at 73, so that when the head 48 is unseated, the air exhausts past the head 49 and the pin 42, and the pressure in the cylinder is reduced to atmospheric. The spring 14 separates the connector ring 19 and bushing 13 to open the circuit of the transformer 56 as the piston returns to its normal position, and the contact arm 29 connects the control magnet of a juxtaposed welder.

I claim:

1. In a welding machine, a welder supporting bar, a plurality of welders, each of the welders having a piston and cylinder, each cylinder having an end head secured to the bar, means for connecting the heads with a source of supply of air under pressure, movable valve members located in the heads for controlling the pressure in the cylinders, electro-magnets having armatures for operating the movable valve members, levers pivotally connected to and extending across and protruding from the sides of the cylinders and operated by the pistons, welding points connected to the protruding ends of the levers, a source of supply of electric current, a commutator means for sequentially connecting the said electro-magnets to the source of supply for operating the valves, means for directing a welding current through the welding points as they are operated by the welders.

2. In a welding machine, welder supporting bars, a plurality of welders, each of the welders having a piston and cylinder, the cylinders having valve containing heads connected to the bars, movable valve members located in the heads, means for connecting the heads with a source of supply of air under pressure, electro-magnets and armatures for operating the movable valve members, the cylinders having lever supporting heads, the piston rods extending through the lever supporting heads, brackets extending laterally from the lever supporting heads, levers pivotally connected to the ends of the brackets and extending across the ends of the cylinders and having welding points at their ends, the welding points of the welders connected to one bar located in alignment with the welding points of the welders connected to the other bar, flexible laminated conductors connected to the levers, a pair of bus bars connected to the said conductors, a work supporting bus bar located below the welding points of the welders, a commutator member having a plurality of contacts connected to the magnets, a transformer for producing a welding current, the secondary of the transformer connected to the said bus bars, an electro-magnetic switch for connecting the primary of the transformer to a source of supply of electric current, means operated by the pistons for connecting the electro-magnetic switch with the source of current when the welding points engage the work at a welding pressure.

3. In a welding machine a pair of welder supporting bars, a plurality of welders, each of the welders having a piston and cylinder, the cylinders having valve containing heads, means for securing the heads of the cylinders to the bars, means for connecting the heads to a source of supply of air under pressure, movable valve members located in the heads, the valve members having sockets, pins extending exterior to the heads and located in the sockets for yieldingly transmitting the pressure of the pins to the valve members, electro-magnets and armatures for pressing the pins to actuate the valve members and supported on the heads, the cylinders having lever supporting heads, brackets connected to the lever supporting heads, levers pivotally connected to the ends of the brackets and having welding points, the welding points of the welders connected to one welder supporting bar located in alignment with the welding points of the welders connected to the other welder supporting bar, a pair of bus bars, flexible laminated conductors connected to the levers and to the bus bars, a work supporting bus bar for supporting work in position to be engaged by the work, a commutator having a plurality of contacts connected to the magnets, a contact arm, means for connecting the contact arm to the source of supply of electric current, means for rotating the contact arm for sequentially connecting the magnets to the source of supply of electric current, a transformer for producing welding current, one of the terminals of the secondary of the transformer connected to the said pair of bus bars, the other terminal of the said transformer connected to the work supporting bus bar, an electro-magnetic switch for connecting the primary of the transformer to the source of supply of electric current, means operated by the pistons for connecting the electro-magnetic switch with the source of supply of electric current when the welding points are pressed against the work at a welding pressure.

WILLIAM H. MARTIN.